UNITED STATES PATENT OFFICE.

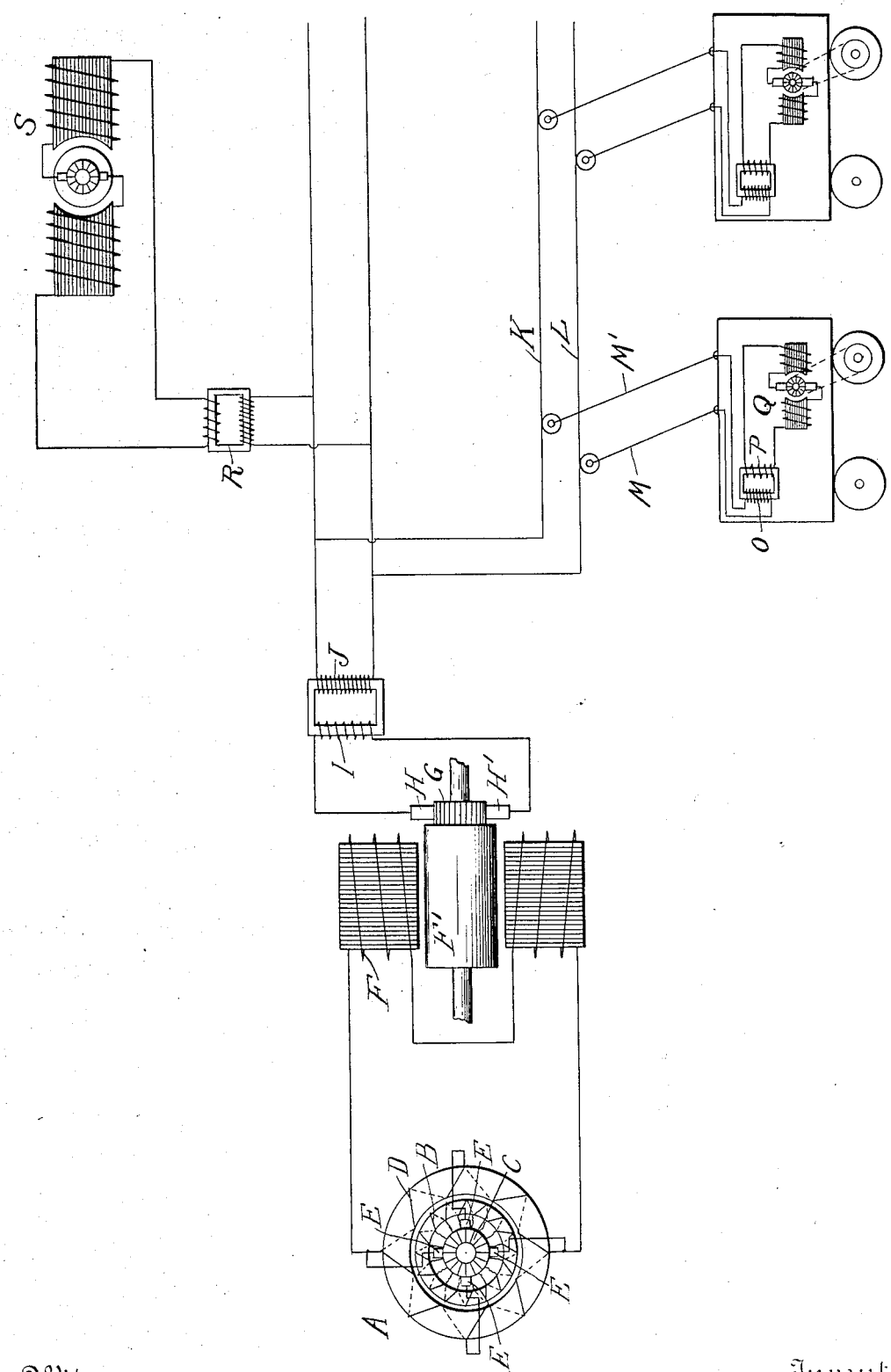

WILLIAM STANLEY, OF GREAT BARRINGTON, MASSACHUSETTS.

MEANS AND METHOD OF TRANSMITTING POWER.

No. 817,998.  Specification of Letters Patent.  Patented April 17, 1906.

Application filed March 10, 1905. Serial No. 249,382.

*To all whom it may concern:*

Be it known that I, WILLIAM STANLEY, a citizen of the United States, residing at Great Barrington, Berkshire county, Massachusetts, have invented certain new and useful Improvements in Means for and Method of Transmitting Power, of which the following is a full, clear, and exact description.

My invention relates to a means for and method of transmitting power in which alternating currents are supplied to alternating-current motors of the direct-current type, and has for its object to provide a system and method in which the principal advantages of alternating-current distribution are present and also the principal advantages of direct-current motors are present. It is particularly useful in connection with electric-railway systems, where a strong starting torque is required. Its advantages, however, are not confined to electric-railway systems, but may be availed of in other relations, as will be evident to those skilled in the art.

As is well known, when it is desirable to transmit large values of electrical energy over considerable distances alternating currents enable such transmissions to be made economically by the employment of a system of high-potential transmission with transformers at or near the points where the energy is to be supplied to translating devices. Hitherto when it was desired to convert the electrical energy so transmitted and transform it into mechanical work by means of alternating-current motors serious difficulties were encountered. If motors of the induction or transformed type were employed for such purpose, it was found practically impossible to cause the time of flow of the field-flux and the secondary current to coincide—that is to say, the flux made by the field-coils of the motor was not usefully employed at all times or during every part of each wave interval, and a counter-torque effect was set up by reason of this failure to coincide, with the result that the effective torque or effect of the motor, especially at starting, was much reduced below the value that would be obtained if the currents impressed upon the motor were continuous in direction and of steady value. If, on the other hand, a motor of the commutator type with laminated or divided iron path for its flux was employed with the alternating currents heretofore used, other difficulties arose, so that only a portion of the electromotive force impressed upon the motor-terminals was usefully employed, a considerable proportion—such, for instance, as twenty per cent.—of such electromotive force being employed in overcoming the self-induction electromotive force of the motor-circuit produced by the rapidly-alternating current. Moreover, in such commutator-motors the conductors of the armature connected to the commutator were subject to induced currents, and these currents not only did not add to the effective torque of the motor, but caused heating of the armature and flashing and burning of the commutator and brushes to such an extent as to render the operation of the motor uncommercial and unsatisfactory. Again, where such commutator-motors were used with the alternating currents heretofore employed it was necessary in order that the self-induction of the motor might not consume a very great portion of the electromotive force impressed upon it that the fields or fluxes of the motor should be relatively weak in comparison with the fields that would be employed with the motor energized by continuous currents, and the design necessitated by the use of such weak fields increased the size and cost of motors and reduced their output.

I have discovered that by the use of very low frequency currents—such, for example, between three cycles and fifteen cycles per second—motors of the commutator type may be designed of very low self-induction, and therefore free from the trouble arising when motors of the commutator type are used with generators of high frequency, and that the induced currents generated in them will not be sufficient to cause serious heating of the conductors or burning or flashing of the commutators. I have further discovered that these very low frequency currents have the same advantage of distribution as the alternating currents of the frequency heretofore used—that is, the energy can be transmitted by alternating currents of high potential and at the points of consumption transformed by induction into currents of a low potential of the original frequency. In carrying out my invention, therefore, I employ alternating currents of a frequency, say, between three cycles and fifteen cycles per second, transmitting the energy at high potential and transforming it at the points of consumption into currents of low potential and there using it to operate motors of the commutator type having laminated or divided iron paths for the flux. This system may be availed of for traction purposes or for transmission in which stationary motors are employed.

In case it is used for traction purposes I prefer to locate the step-down transformer on the car whose motor is to be supplied. In this way the advantages of high-potential transmission are preserved without regard to the point on the system at which the car may be. Thus a car remote from the power-house will be supplied with energy without the use of any low-potential mains, such as would be necessary in case stationary step-down transformers were used to supply sections of the overhead conductor. The energy would always be transmitted to the car at high potential wherever the car might be. The high-potential transmission system in which the trolley-wires themselves constitute the transmission mains enables the transmission to be effected with a great saving in energy when the same amount of copper is employed as would have to be employed in a low-potential transmission system and if the same loss is to be permitted as would be present with low-power transmission permits the use of a much smaller amount of copper, and thus saves in the cost of the original installation. It does away with the rotary converters now generally necessary and relies only on the static transformers, which by reason of their simple inductive action do not require attention by or care of an attendant.

Any frequency between three cycles and fifteen cycles per minute produces sufficient change of value to enable a current of one potential—as, for example, ten thousand volts—to be transformed to another of a lower potential—as, for example, five hundred volts—when applied to closed-circuited transformers, a type of apparatus developing a maximum inductance from a minimum value of current-flow, while at the same time the transformed currents may, because of their low frequency, be used to energize and operate motors of the continuous-current type of laminated magnetic circuit, a type of apparatus which does not possess as great inductance as do the transformers above mentioned and do not, therefore, with such low frequencies develop induced electromotive forces of sufficient value to materially change the characteristics and output of such motors from that found when they are operated on continuous-current circuits. The frequency chosen depends upon the local conditions of the undertaking, as hereinafter specified, but must be so low as not to generate the objectionable electromotive forces and induced currents above referred to. The potential at which the currents are transmitted may be as high as desired, the same being transformed in the well-known manner to currents of low potential suitable for use in the motive devices. If currents of a frequency of twenty-five periods were employed to operate motors of the commutator type, some twenty per cent. of the effective electromotive force would be consumed in overcoming the self-induction of the field, while if a current having a frequency of five periods were used only a negligible per cent. of the effective electromotive force would be thus consumed. Thus a motor operated by a five-period current and having the same electromotive force of self-induction as another motor operated at twenty-five periods could have a field strength or total flux $\sqrt{5}$ times as great and a torque $\sqrt{5}$ times as great as the twenty-five-period motor.

In the same manner the electromotive force of self-induction and the induced currents in the armature-winding may be reduced to one-fifth their value when five-period currents are substituted for twenty-five-period currents, a condition that reduces the waste energy in such coils to one-twenty-fifth of the amount found at the higher (twenty-five period) frequency. In fact, the low frequency permits of obtaining substantially the same torque output and operation as may be obtained by motors operated at zero frequency—that is to say, by continuous currents—and yet possesses the advantages of generation, transmission, and transformation obtained by employing transformers of the usual type.

A frequency of five periods per second results in currents which are well adapted to the service of electric locomotion where trolley-wires are to be supplied with low-potential currents which are to be directly supplied to motors or to the application of power where it is desirable to use large values of energy in one spot and where, consequently, transformers would be of large capacity. When, however, the power is to be distributed in smaller units of high potential—as, for instance, in the operation of individual motors by individual transformers on a number of cars connected together or singly, in which case the size of the motors and their transformers is reduced—the frequency employed may be advantageously increased from five periods to ten periods or even fifteen periods per second without involving corresponding disadvantages, the general rule being that the frequency employed shall be inversely proportional to the unit of work of the service, a car equipment with its step-down transformer and motor being considered a unit of work. The increase in frequency permits the use of smaller transformers and a corresponding decrease in the expense of the installation. It must, however, be kept so low as not to develop an objectionable electromotive force of self-induction or to produce large secondary currents in the induced members aforementioned.

The following is a description of apparatus embodying my invention and adapted for carrying out my method, reference being had to the accompanying diagram-drawing, which shows a proper combination of the necessary elements for carrying out my invention.

Referring to the drawing, A represents a low-frequency exciter consisting of an armature having a winding B, whose coils are connected to segments of the commutator C.

D is the field-magnet winding of the closed-circuited type, tapped at four equidistant points and connected to brushes E, bearing upon the commutator C.

F is an energizing-winding of a low-frequency generator connected to two of the brushes. The magnetic circuit of this generator is laminated. F' is the armature of the generator having a commutator G, on which the brushes H H' rest. Since the field of the generator is excited by low-frequency currents, low-frequency electromotive forces are impressed upon the brushes H H', the frequency being independent of the speed of rotation of the generator-armature.

I is the primary of a step-up transformer, of which J is the secondary, connected to the distributing-mains. To the distributing-mains are connected conductors K L, supported in any well-known manner, for supplying electrical energy to electrically-propelled vehicles. M M' are trolleys mounted on top of the car and forming the terminals of the primary O of a step-down transformer. P is the secondary of the step-down transformer connected to the terminals of a series-wound motor Q, having low self-induction and provided with a laminated magnetic path for its flux. The motor is mechanically connected to the wheels of the vehicle, so as to propel the same.

The system being a constant-potential system, the motors on other cars are connected to the mains by similar devices, the motors on the several cars being in parallel with one another.

It is obvious that other circuits may be connected to the transmission-mains, so as to supply stationary motors or motor-generators for power, lighting, or other purposes. Thus, for instance, R is a transformer, and S is a motor supplied thereby, the two being similar to the equipment shown and described on one of the electrically-propelled vehicles, but connected directly to the mains instead of to other conductors, with which to engage moving contacts.

From the foregoing it will be seen that in carrying out my method in the embodiment shown I first produce low-frequency exciting-currents, and thereby energize the field of a generator of the commutator type, impressing upon the brushes of such generator alternating electromotive forces having the same periodicity as the exciting-currents. These brushes being connected to the terminals of the primary of a step-up transformer produce currents which are transformed into high-potential currents and are transmitted over the circuit to the point of consumption and are there transformed into currents of low potential and supplied to motors of the commutator type having laminated paths for their fluxes. When used for electric traction, I increase or diminish the length of the high-potential circuit between the generator and the motor without increasing or diminishing the length of the circuit over which low-potential currents are carried. I therefore always have the advantage of high-potential transmission to the vehicle itself.

The system and method are simple in construction and operation and result in increased efficiency both in matter of transmitting the energy and utilizing the same. The invention admits of embodiment in various forms. Thus a step-up transformer is not necessary if the main generator produces a sufficiently high potential; neither is a separate exciter necessary provided a generator of the self-exciting type is used. My invention, therefore, is not limited to the precise apparatus shown or the precise method carried out thereby.

What I claim is—

1. In a system of distribution, the combination of means for generating low-frequency currents of high potential, mains leading therefrom, step-down transformers connected in multiple to said mains, and motors of the commutator type connected to the secondaries of said transformers.

2. In a system of distribution, the combination of means for generating low-frequency currents of high potential, mains leading therefrom, step-down transformers connected in multiple to said mains, and motors of the commutator type connected to the secondaries of said transformers, said motors having laminated paths for their magnetic fluxes.

3. In a system for transmitting power, the combination of a low-frequency exciter, a generator of the commutator type having a field energized by the low-frequency currents supplied from said exciter, mains leading from said generator, step-down transformers connected in multiple to said mains, and motors of the commutator type supplied by said step-down transformers.

4. In a system of transmission of power, the combination of a self-exciting low-frequency generator, a main generator having its field energized by currents produced by said low-frequency exciter, mains leading therefrom, step-down transformers connected in multiple to said mains, and motors supplied by the secondaries of said step-down transformers.

5. In any system for transmitting power, the combination of a field-magnet energized by alternating currents of low frequency, an armature rotating relatively to the field produced thereby, said armature being provided with a commutator, brushes bearing upon said commutator, a step-up transformer having its primary connected to said brushes, mains connected to the secondary of said step-up transformer, a plurality of step-down transformers connected in multiple to said mains, and motors of the direct-current type connected to the secondaries of said transformers.

6. In a system of distribution, the combination of means for generating low-frequency currents of high potential, mains leading therefrom, step-down transformers connected in multiple to said mains, and motors of the commutator type connected to the secondaries of said transformers, a series of vehicles propelled by said motors, and movable contacts carried by said vehicles and located in the circuit between said step-down transformers and said mains.

7. The method of transmitting power, which consists in generating alternating currents of low frequency and of high potential transmitting such currents to the point of consumption, and there transforming them into currents of low frequency and lower potential, and energizing by such low-frequency low-potential currents a motor of the direct-current type.

8. The method of transmitting power to a moving vehicle which consists in generating alternating currents of high potential and low frequency, transmitting said energy to said vehicle, and there transforming it to alternating currents of low potential and low frequency and supplying it to a motor of the commutator type located on said vehicle.

Signed at Great Barrington this 8th day of March, 1905.

WILLIAM STANLEY.

Witnesses:
F. L. SNOW,
J. C. FREIN.